No. 697,472. Patented Apr. 15, 1902.
H. GIESSEL.
COOKING UTENSIL.
(Application filed Nov. 9, 1900. Renewed Mar. 19, 1902.)
(No Model.)
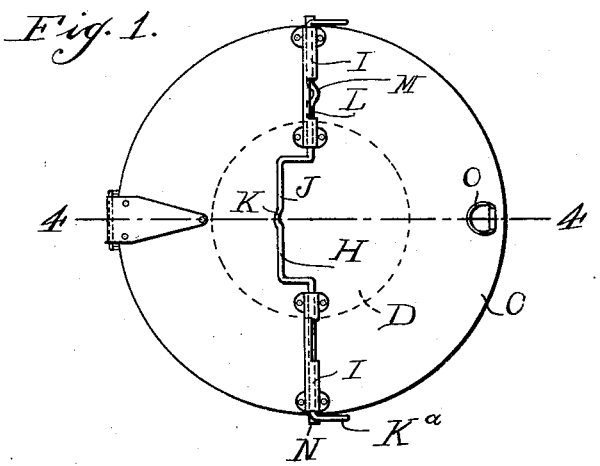
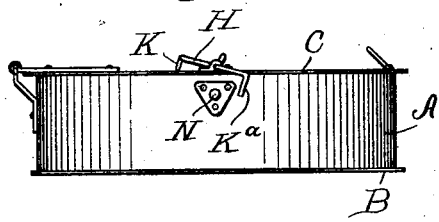
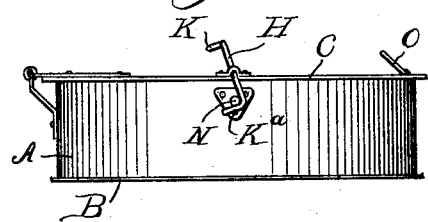
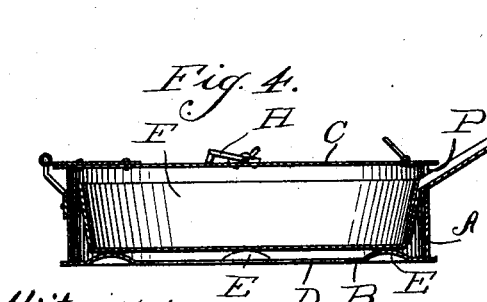
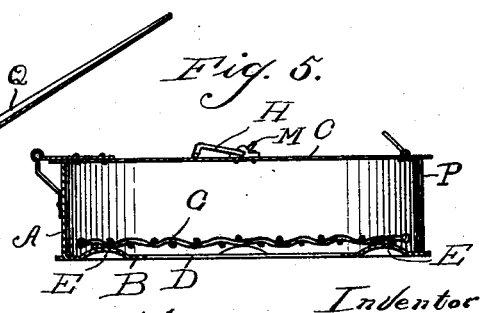
Witnesses:
C. F. Wilson
Jno. J. Snowhook
Inventor:
Henry Giessel
By Rudolph Wm. Lotz
Attorney.
THE NORRIS PETERS CO., PHOTO-LITHO., WASHINGTON, D. C.

UNITED STATES PATENT OFFICE.

HENRY GIESSEL, OF CHICAGO, ILLINOIS.

COOKING UTENSIL.

SPECIFICATION forming part of Letters Patent No. 697,472, dated April 15, 1902.

Application filed November 9, 1900. Renewed March 19, 1902. Serial No. 98,961. (No model.)

*To all whom it may concern:*

Be it known that I, HENRY GIESSEL, a citizen of the United States, residing at Chicago, in the county of Cook and State of Illinois, have invented certain new and useful Improvements in Cooking Utensils; and I do hereby declare the following to be a full, clear, and exact description of the invention, such as will enable others skilled in the art to which it appertains to make and use the same.

My invention relates to an improved cooking utensil, the object being to provide a device which will prevent the vaporized products of frying or broiling from being dissipated into the room and which can be lifted by a handle pivoted on the cover thereof; and it consists in the features of construction and combinations of parts hereinafter fully described and claimed.

In the accompanying drawings, illustrating my invention, Figure 1 is a top plan view of a utensil made in accordance with my invention. Figs. 2 and 3 are side elevations showing the handle at the two limits of its movement. Fig. 4 is a sectional view on the line 4 4 of Fig. 1, showing a pan within the utensil. Fig. 5 is a section similar to Fig. 4, but showing a wire grate for broiling purposes in place of the pan.

In said drawings, A represents a shallow cylindrical receptacle provided with a bottom B and a hinged cover C. Said bottom is provided with a large central opening D, so that when said utensil is placed on a stove or other source of heat the heated air can pass directly to the interior thereof. Said bottom is also provided with three or more upward projections E, adapted to support the pan F or broiler G above the bottom of said receptacle. A wire bail or handle H is provided, which is pivotally mounted on said cover diametrically across same at right angles to a diametrical line drawn through the hinge of said cover. Said bail is secured to said cover by the U-shaped clips I, mounted adjacent the edges of said cover, leaving said bail free to turn. The middle portion J of said bail, between the inner ends of said clips, is offset, forming a handle, which is provided on its middle portion with a U-shaped loop or offset portion K, adapted to hold said handle portion slightly above said cover C. The middle portions of said clips I are cut away on one side, as at L, and the wire bail H is provided with one offset U-shaped loop M within said cut-away portion of one of said clips, which is adapted when said bail is turned into the position shown in Fig. 3 to strike the cover C and prevent said bail from turning any farther when the same is raised. The ends of said bail are bent at right angles in a plane with said middle portion and again at right angles parallel with the offset portion K in the middle of said handle, thus forming the hook portions $K^a$, which are adapted when the bail is raised to the position shown in Fig. 3 to project under lugs N, which are secured to the sides of said receptacle, thus locking said cover C with said receptacle A. A ring O is provided on said cover adjacent the edge opposite the hinge for convenience in raising said cover. An opening P is provided in the upper edge of said receptacle A and is adapted to allow the handle Q of the pan F to project therethrough. Should it be desirable to lift said receptacle without opening same, the bail is raised to the position shown in Fig. 3, thus locking the cover with the receptacle, and then the whole may be raised together.

In using this device with a pan or broiler the cover will prevent the fumes from rising, and they will be drawn down through the opening D in the bottom thereof and into the fire, thus being destroyed or passing up into the chimney.

I claim as my invention—

1. A cooking utensil comprising a receptacle, a cover hinged on said receptacle, a bail pivotally mounted on said cover, having its middle portion offset to form a handle, hooks formed on the ends of said bail, practically diametrically opposite said handle, adapted to be depressed as said handle is raised, lugs on said receptacle adapted to be engaged by said hooks as said handle is raised, and a projection on said bail adapted to strike said cover as said bail is raised to prevent same from being turned past an upright position.

2. A cooking utensil comprising a receptacle, a cover hinged on said receptacle, a bail pivotally mounted on said cover, having its middle portion offset to form a handle, a projection on said handle portion adapted to hold said handle slightly above said cover when said bail is in its normal position, hooks formed on the ends of said bail, practically diametrically opposite said handle, adapted to be depressed as said handle is raised, lugs on said receptacle adapted to be engaged by said hooks as said handle is raised, and a projection on said bail adapted to strike said cover as said bail is raised to prevent same from being turned past an upright position.

In testimony whereof I affix my signature in presence of two witnesses.

HENRY GIESSEL.

Witnesses:
E. F. WILSON,
JNO. J. SNOWHOOK.